United States Patent [19]
Reuter et al.

[11] Patent Number: 5,607,208
[45] Date of Patent: Mar. 4, 1997

[54] BRAKE SYSTEM WITH HYDRAULIC ABS MODULATOR

[75] Inventors: David F. Reuter, Beavercreek; Dewey F. Mort; John A. Guernsey, both of Dayton, all of Ohio

[73] Assignee: General Motors Corporation, Detroit, Mich.

[21] Appl. No.: 362,228

[22] Filed: Dec. 23, 1994

[51] Int. Cl.⁶ ........................................ B60T 8/34
[52] U.S. Cl. ............................ 303/113.5; 303/115.4
[58] Field of Search .................. 303/9.62, 9.75, 303/113.5, 115.4, 116.1, 116.2

[56] References Cited

U.S. PATENT DOCUMENTS

| | | | |
|---|---|---|---|
| 5,096,269 | 3/1992 | Pickenhahn | 303/115.4 |
| 5,114,216 | 5/1992 | Tsuda et al. | 303/115.4 X |
| 5,180,211 | 1/1993 | Weise et al. | 303/113.5 |
| 5,312,175 | 5/1994 | Ando et al. | 303/117.1 |

*Primary Examiner*—Lee W. Young
*Attorney, Agent, or Firm*—Jeffrey A. Sedlar

[57] ABSTRACT

An ABS hydraulic modulator concept designed for application in vehicle braking systems is presented. The design utilizes an integrated hybrid approach of dual apply/release solenoid control and single solenoid/isolation valve assembly control. Opening of the single solenoid induces an ABS release and causes the isolation valve assembly to close effecting wheel brake pressure reduction.

6 Claims, 4 Drawing Sheets

BRAKE SYSTEM WITH HYDRAULIC ABS MODULATOR

BACKGROUND OF THE INVENTION

The present invention relates to fluid brake systems for vehicles. More particularly, the invention involves the integration of anti-lock braking control into a vehicle's fluid brake system.

The subject of this application is related to the following co-pending patent applications: U.S. Ser. No. 08/363,080 entitled "Hydraulic ABS Modulator" and U.S. Ser. No. 08/362,229, now U.S. Pat. No. 5,538,336, entitled "Integrated ABS/TCS Hydraulic Modulator Braking System," both commonly assigned, filed concurrently with this specification and both of which are hereby, specifically incorporated herein by reference.

Conventional vehicle fluid brake systems are characterized by providing the ability for effective wheel braking in response to manual application of force to a brake pedal actuator. The art has adapted the conventional vehicle fluid brake system to automatic control mechanisms which intervene in the event of certain conditions and provide advanced braking functions. One such mechanism, an anti-lock braking system (ABS), generally represents a combination of hydraulic and electric control.

A typical ABS system inhibits the vehicle's wheel brakes from locking up by releasing the applied fluid pressure when an incipient wheel lockup condition is sensed. After release of the fluid pressure wheel deceleration ceases and the wheel begins accelerating toward vehicle speed. When the wheel speed has substantially recovered braking fluid pressure is reapplied. Reapplication of fluid pressure generally results in the wheel again approaching lockup and the cycle is repeated.

The art has proposed that ABS functions can be provided by employing several different mechanisms. The problem posed in developing an ABS braking system is to provide optimum operation considering system response, adaptability and efficiency while concurrently avoiding unnecessary complexity and cost. This presents a significant challenge in the development of vehicle braking systems.

SUMMARY OF THE INVENTION

The present invention provides a braking system which utilizes a new hydraulic ABS modulator concept. A unique hybrid hydraulic control arrangement provides optimum ABS control from an entire system approach. For ABS operation the braking system utilizes an electric motor which powers a hydraulic pump unit for recirculating brake fluid. The hydraulic circuit components include a dual apply solenoid/release solenoid arrangement for two of the vehicle's wheel brakes. A unique ABS apply orifice and isolation valve arrangement with preferred upstream proportioners is used for the remaining two vehicle wheels.

This invention includes a number of advantages as will be apparent to those skilled in the art. Among these is the invention's ability to be equally well utilized on front wheel drive vehicles which generally have a diagonal split brake circuit distribution and on rear wheel drive vehicles which generally have a front-to-rear axle split brake circuit distribution. The invention is readily adaptable to various multiple channel brake control system configurations.

Additionally, the system utilizes a reduced number of electromechanical solenoid valves to perform the required ABS cycling. The hybrid modulator includes relatively non-complex isolation valves which are designed for manufacturability and relatively low cost. The base brake isolation valve provides a means for providing an interruptable, unorificed base brake pressure application mechanism. An optional means for providing complete closure of the ABS apply orifice during release cycles enables achieving very low ABS release pressures even concurrent with high master cylinder pressure inputs. This also allows for the use of smaller, lower power dissipating pump motors since no additional fluid flow during ABS release is used.

The isolation valve system is adaptable to providing minimal base brake flow orificing which is directed towards optimized base brake first cycle response times. By avoiding extremely small orifice passageways in the base brake isolation valve assembly, system evacuate and fill processes are improved at the assembly plant. These being but a part of the overall system's many advantages, the following detailed description is intended to provide a further understanding thereof.

DETAILED DESCRIPTION OF THE PRESENTLY PREFERRED EMBODIMENTS

Figure 1:
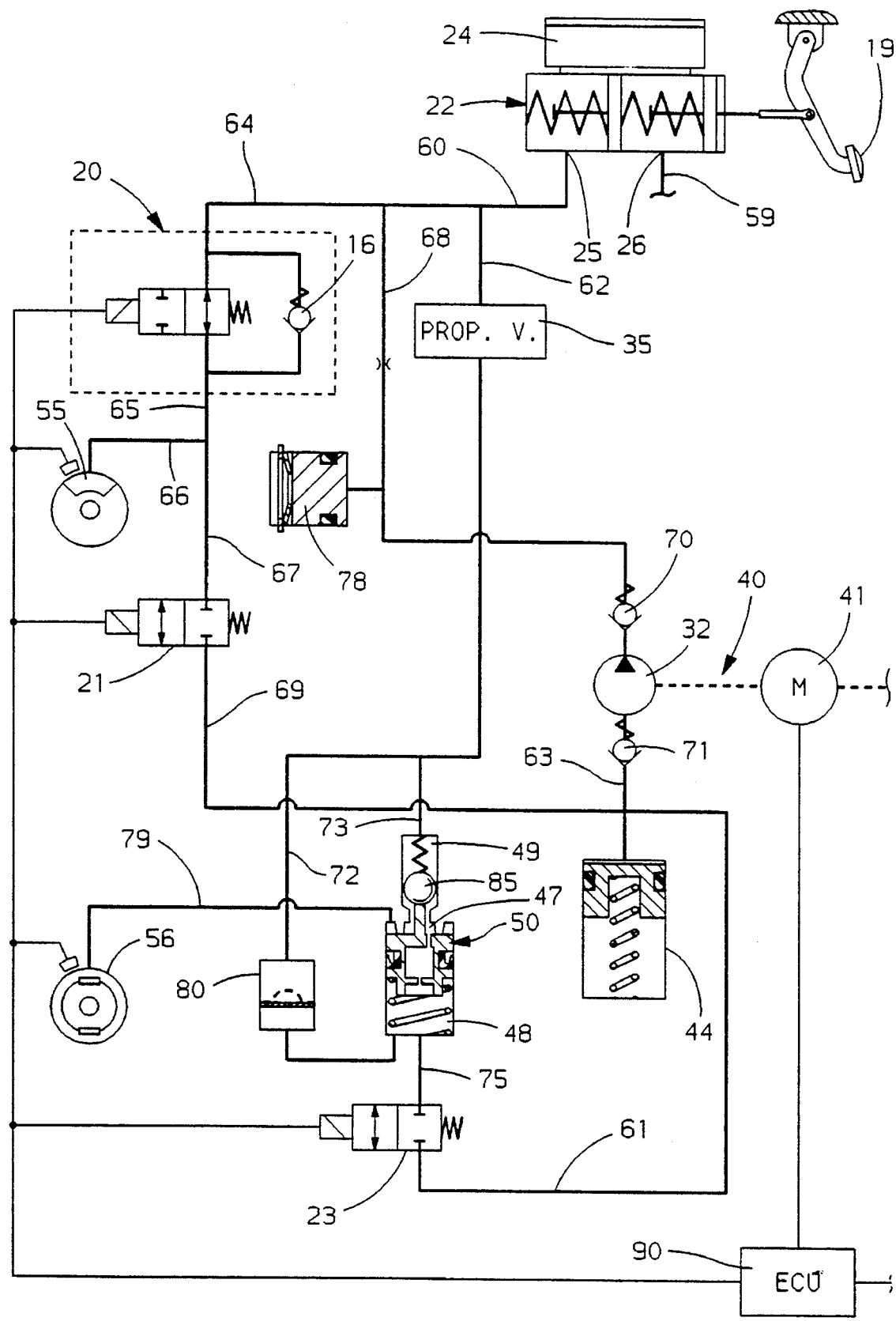
FIG. 1 is a partial graphic symbol fluid diagram of a brake system according to the present invention.

Referring to FIG. 1, illustrated is one master cylinder circuit of a diagonally split braking system with hybrid ABS capability. Shown is essentially half of a brake system according to the present invention. Master cylinder 22, pump assembly 40 and ECU 90 operate with an entire system that includes an additional two-wheel brake control in the same manner as the control for wheel brakes 55 and 56. Generally, the portion of the system shown includes that portion of a brake modulator for supplying one front and one rear wheel brake of a diagonally split two-channel system.

In greater detail, master cylinder 22 has fluid reservoir 24 integrated therewith for supplying fluid through ports 25 and 26 to two separate braking channels. The channel supplied by port 25 being described in detail is meant to illustrate both channels which are substantially identical.

The master cylinder 22 is of the conventional dual piston type and includes dual pressure chambers, one in fluid communication with port 25 and the other being in fluid communication with port 26. Fluid reservoir 24 supplies fluid to the master cylinder 22 during operation. By cooperating with a brake pedal actuator 19 a selectively applied means of manual actuation is provided for the master cylinder 22.

Leading from port 25 of master cylinder 22 is conductor 60. Conductor 60 branches into conductors 62 and 64. Conductor 62 generally supplies fluid to rear wheel brake 56. Conductor 64 generally supplies fluid to front wheel brake 55. Conductor 64 extends to apply solenoid valve 20. Interconnected with conductor 64 is conductor 68. Conductor 68 originates at pump 32, includes check 70 and includes an optional damper assembly 78. Damper assembly 78 is preferably provided to dampen pulsations generated by pump 32 during operation thereof.

Apply solenoid valve 20 is embodied as a two-way solenoid operated valve with an integral check. In its normally open condition, apply solenoid valve 20 provides an unhindered fluid passage from master cylinder 22 to wheel brake 55 through associated conductors 60, 64 65 and 66. When energized, apply solenoid valve 20 is moved to a closed condition which prohibits flow through the valve from conductor 64 to conductor 65 while concurrently permitting a flow of fluid through the integral check 16 from conductor 65 to conductor 64. In the illustrated embodiment the check 16 is integrated into an assembly with apply solenoid valve 20. However, check 16 is optionally provided in parallel as a separate modulator component.

Interconnected with conductor 66 is conductor 67 which leads to release solenoid valve 21. Release solenoid valve 21 comprises a normally closed solenoid actuated valve. In its normally closed condition, release solenoid valve 21 prohibits flow between conductor 67 and conductor 69. Thereby, release solenoid valve 21 maintains the pressure at wheel brake 55 as supplied thereto through apply solenoid valve 20. When energized, release solenoid valve 21 freely permits a flow of fluid between conductor 67 and conductor 69.

Conductor 69 is interconnected with conductor 63. Conductor 63 includes check 71 and returns to pump 32 completing a circuit for the supply and return of fluid from pump 32 to wheel brake 55. Conductor 63 is also in fluid communication with accumulator 44. Accumulator 44 provides a means for receiving released fluid from wheel brake 55 through release solenoid 21 where it is temporarily held and made available to pump 32 for delivery back to wheel brake 55 or master cylinder reservoir 24.

Conductor 62 interconnects with conductor 60 and therethrough is in fluid communication with port 25 of master cylinder 22. Thereby, a means of supplying fluid to rear wheel brake 56 is provided. A proportioner 35 is provided in conductor 62 upstream of rear brake 56 and its associated modulator circuit to selectively proportion fluid pressure to wheel brake 56 in relation to wheel brake 55 from master cylinder 22 and pump 32 as predetermined according to system design parameters.

Conductor 62 branches into conductors 72 and 73. Conductors 72 and 73 provide parallel flow paths for fluid flowing from conductor 62 to the wheel brake 56. Conductor 72 includes apply orifice assembly 80 and is in fluid communication with chamber 48 of base brake isolation valve 50. Apply orifice 80 is positioned in conductor 72 and embodies a fixed restriction to fluid flow. Conductor 73 is in fluid communication with chamber 49 of base brake isolation valve 50. During normal base braking operation, fluid flow through both conductors 72 and 73 ultimately enters base brake isolation valve 50, exits into conductor 79 and continues on to wheel brake 56.

Figure 2:
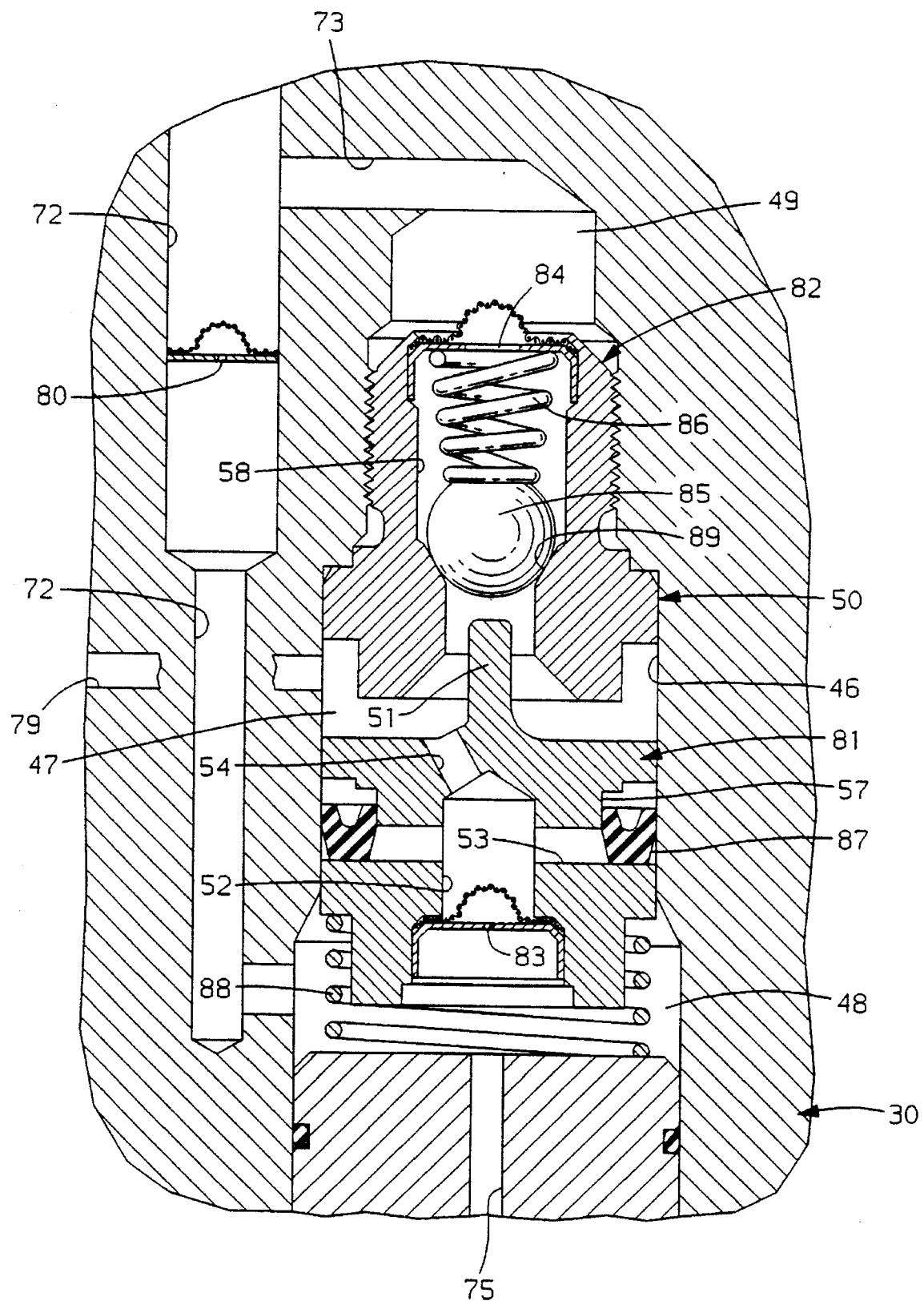
FIG. 2 is a schematic illustration of a base brake isolation valve and apply orifice assembly.

Referring to FIG. 2, base brake isolation valve assembly 50 is illustrated in greater detail. Base brake isolation valve assembly 50 is disposed in bore 46 of module 30. Insert 82 is fixed in position in bore 46 and includes axial bore 58. Valve seat 89 is formed along axial bore 58 by insert 82. Spring retainer 84 engages insert 82 and retains spring 86 in bore 58. Ball 85 is also contained in bore 58 and is biased against valve seat 89 by spring 86.

Also positioned in bore 46 is piston 81. Piston 81 includes circumferential annular groove 57 which carries lip seal 87.

Axial bore 52 extends partially into piston 81 and interconnects with release bore 54 which is angularly disposed and also extends through the top of piston 81 such that a fluid passageway is established through piston 81.

ABS release orifice 83 fixedly engages piston 81 and establishes a fixed restriction to flow between axial bore 52 of piston 81 and chamber 48. Piston 81 also includes protrusion 51 which is shaped for extending into axial bore 58 of insert 82 at valve seat 89. Spring 88 normally biases piston 81 toward insert 82 such that protrusion 51 moves ball 85 to compress spring 86 and remain positioned off valve seat 89. This maintains a normally open flow path between chamber 49 and chamber 47. (FIG. 2 illustrates base brake isolation valve assembly 50 in the closed position).

Chamber 47 is in fluid communication with conductor 79 which leads to wheel brake 56 as illustrated in FIG. 1. Therefore, during normal braking operation fluid entering base brake isolation valve assembly 50 at chamber 49 is free to pass on to wheel brake 56 and return therefrom. Optionally, the hole in spring retainer 84 is deliberately sized to provide some flow restriction to balance other system considerations.

Additionally, during normal braking operation, fluid flow from master cylinder 22 passes through apply orifice assembly 80 in conductor 72, and into chamber 48 whereupon the pressurized fluid compresses lip seal 87 and passes relatively uninhibited between lip seal 87 and the wall of bore 46 into chamber 47 and on through conductor 79 to wheel brake 56. Cross bore 53 is positioned adjacent lip seal 87 and communicates with annular groove 57 to facilitate the operation of lip seal 87.

Again referring to FIG. 1, conductor 75, which is in fluid communication with chamber 48 of base brake isolation valve assembly 50, extends to release solenoid valve 23. Release solenoid valve 23 comprises a normally closed solenoid operated valve. Conductor 61 extends from release solenoid valve 23 to conductor 63 where fluid communication is established with pump 32 and accumulator 44. Therefore, conductor 61 provides a return from the rear wheel brake circuit to pump 32 thereby completing the circuit. From pump 32 fluid is pressurized for pumping back to wheel brake 56 or return to reservoir 24.

In base brake operation, master cylinder 22 is power boosted by a conventional means (not illustrated) for providing fluid flow to the front wheel brake 55 and rear wheel brake 56 through port 25 and to two other wheel brakes (not illustrated), through port 26. Upon actuation of master cylinder 22 fluid exits ports 25 and 26 through conductors 60 and 59 into the hydraulic modulator. The operation of one braking channel through conductor 60 for one front wheel brake 55 and one rear wheel brake 56 is provided. Fluid flow to the front wheel brake 55 passes unrestricted through normally open apply solenoid 20 on through the associated conductors to wheel brake 55. When master cylinder 22 operates to release pressure, fluid flow from wheel brake 55 flows uninhibited through the conductors and apply solenoid 20 back to fluid reservoir 24.

Also during base brake operation, fluid pressure from master cylinder 22 passes through conductor 62 and proportioner 35. From conductor 62 parallel flow paths to wheel brake 56 are provided through apply orifice 80 and base brake isolation valve assembly 50. Fluid flowing to chamber 49 of base brake isolation valve assembly 50 travels past ball 85 through valve seat 89 into chamber 47 and continues through conductor 79 to wheel brake 56. Fluid flowing through orifice assembly 80 continues on to chamber 48 of base brake isolation valve assembly 50 where it substantially flows past lip seal 87 into chamber 47 and through conductor 79 to wheel brake 56.

The ABS mode of operation is engaged when a predetermined amount of wheel slip is detected in a braking stop and the ECU 90 determines that corrective action of brake pressure regulation is necessary. Motor 41 of pump assembly 40 is immediately turned on. When ABS regulation of the front wheel brake 55 is required, normally closed release solenoid valve 21 is energized and thereby, opened. In coordination, apply solenoid valve 20 is closed. Therefore, fluid pressure at wheel brake 55 is released through release solenoid 21 where it is allowed to temporarily collect in accumulator 44 for return to pump 32 through conductor 63. Apply solenoid 20 and release solenoid 21 are cycled accordingly to control fluid pressure while inhibiting premature lockup of wheel brake 55. A constant pressure hold cycle may be initiated by holding apply solenoid valve 20 and release solenoid valve 21 closed.

When it is determined that the rear wheel brake 56 is in need of ABS regulation, release solenoid valve 23 is energized to initiate a pressure release cycle. The opening of the normally closed release solenoid valve 23 causes an immediate pressure drop in chamber 48 of base brake isolation valve assembly 50. This effects movement of piston 81 to compress spring 88 whereupon protrusion 51 retracts through valve seat 89 such that ball 85 is forced against ball seat 89 by spring 86 thus closing the check of base brake isolation valve assembly 50. The check includes ball 85 which is forced against valve seat 89 by spring 86. The check remains closed until the hydraulic force imbalance between chambers 49 and 47 subsides and pressure is essentially equalized on both sides of the check ball 85, at which time the force of spring 88 is sufficient to reopen the check by unseating ball 85.

The reduced pressure in chamber 48 caused by the opening of the release solenoid valve 23 induces a fluid flow from wheel brake 56 into chamber 47 of base brake isolation valve assembly 50 through ABS release orifice 83 and into chamber 48. From chamber 48 flow passes relatively uninhibited through release solenoid valve 23, is allowed to collect in accumulator 44 and is returned to the intake of pump 32. This action reduces braking force at wheel brake 56 and prevents wheel lock from occurring.

When the pressure at wheel brake 56 has been sufficiently reduced to prevent wheel lock the system begins increasing pressure at the wheel to maximize braking forces. This is accomplished by de-energizing release solenoid 23 and thus stopping flow through the ABS release orifice 83. Fluid flow produced by pump 32 and master cylinder 22 passes through ABS apply orifice 80 into chamber 48 of base brake isolation valve assembly 50, past lip seal 87, into chamber 47 and through conductor 79 to wheel brake 56. Therefore, ABS apply fluid flow passes through base brake isolation valve assembly 50 without causing check ball 85 to unseat.

During the ABS release cycle, flow continues through the apply orifice 80. However, since the release solenoid valve 23 has a relatively large opening as compared to the size of apply orifice 80, wheel pressure is reduced to very low levels. In addition, a side benefit is that this recycled fluid softens pulsations at brake pedal actuator 19 and generally improves pedal feel during ABS operation.

Finally, routing the ABS apply fluid flow in this manner results in fluid pressure at wheel brake 56 being minimized during the ABS release cycles. This is because during pressure release, apply fluid reaching chamber 48 is preferentially carried through conductor 75 and release solenoid valve 23 rather than being applied to wheel brake 56 through conductor 79. Therefore, the embodiment of FIG. 1 enables achieving low pressure at wheel brake 56, which is particularly important in minimal traction situations. The residual pressure at wheel brake 56 during ABS release operation typically drops well below 25 psi. Ball 85 of base brake isolation valve assembly 50 remains seated on ball seat 89 for essentially the entirety of an ABS release cycle. This prevents unorificed fluid flow from the master cylinder 22 to the wheel brake 56.

The lip seal 87 is integral in establishing ABS apply fluid flow during an apply cycle in a bypass route around the release orifice 83. An alternative to this embodiment is to route the output from apply orifice 80 directly to conductor 79.

During ABS apply cycles, if wheel lock is again approached, supplemental release and apply cycles are provided as often as required to achieve the desired ABS control.

The base brake isolation valve assembly 50 remains open during base brake operation. Therefore, the invention has the advantage that minimal base brake flow orificing occurs. Additionally, the ABS apply orifice 80 permits supplemental brake fluid flow in both directions, either toward the wheel brake 56 or the master cylinder 22.

This invention contemplates that a brake system including four wheel brake circuits each provided in a single solenoid arrangement according to the rear brake circuits of FIG. 1 is operable and results in a considerable cost savings. However, because the fluid displacement capacity of front wheel brakes or rear wheel brakes of larger vehicles can be significantly greater, the pump required for such a system is much larger. This is because during ABS release, significantly more fluid must be communicated for a greater displacement wheel brake. Inefficiencies are incurred due to the need to use larger apply orifices and provide higher release capacity routes. Accordingly, this invention carefully balances the cost savings associated with eliminating one solenoid per wheel brake circuit with optimization of the system's operation.

Figure 3:
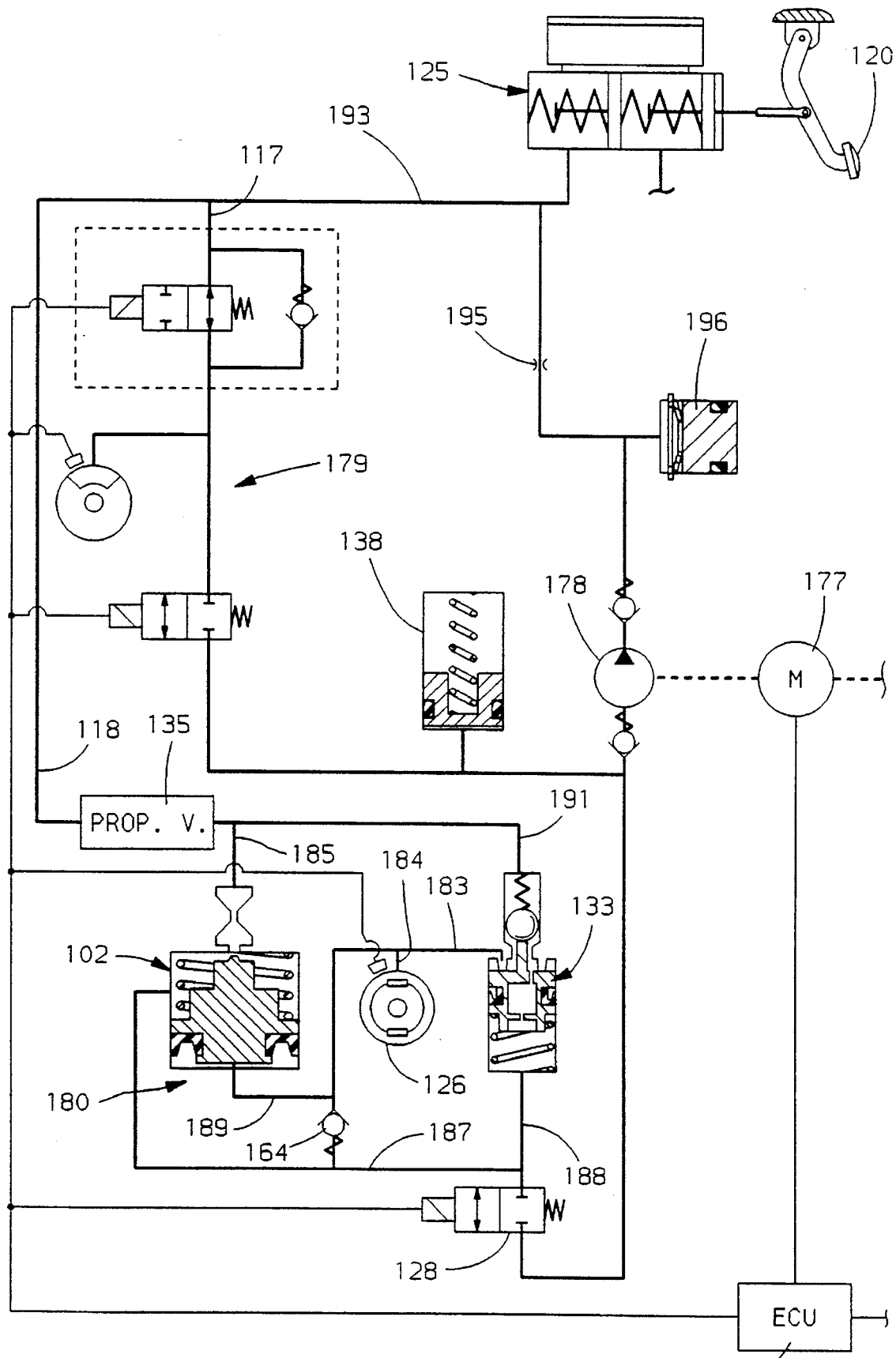
FIG. 3 is a partial graphic symbol fluid diagram of a brake system according to the present invention.

Referring to FIG. 3, an alternative embodiment of the present invention is illustrated. The notable difference between the embodiment of FIG. 1 and the embodiment of FIG. 3 is that the apply orifice assembly 80 of FIG. 1 has been supplanted by an apply orifice isolation valve assembly 102 in FIG. 3. Conduit changes have been made to accommodate the apply orifice isolation valve assembly 102 and check relief valve 164 in the rear brake circuit.

Figure 4:
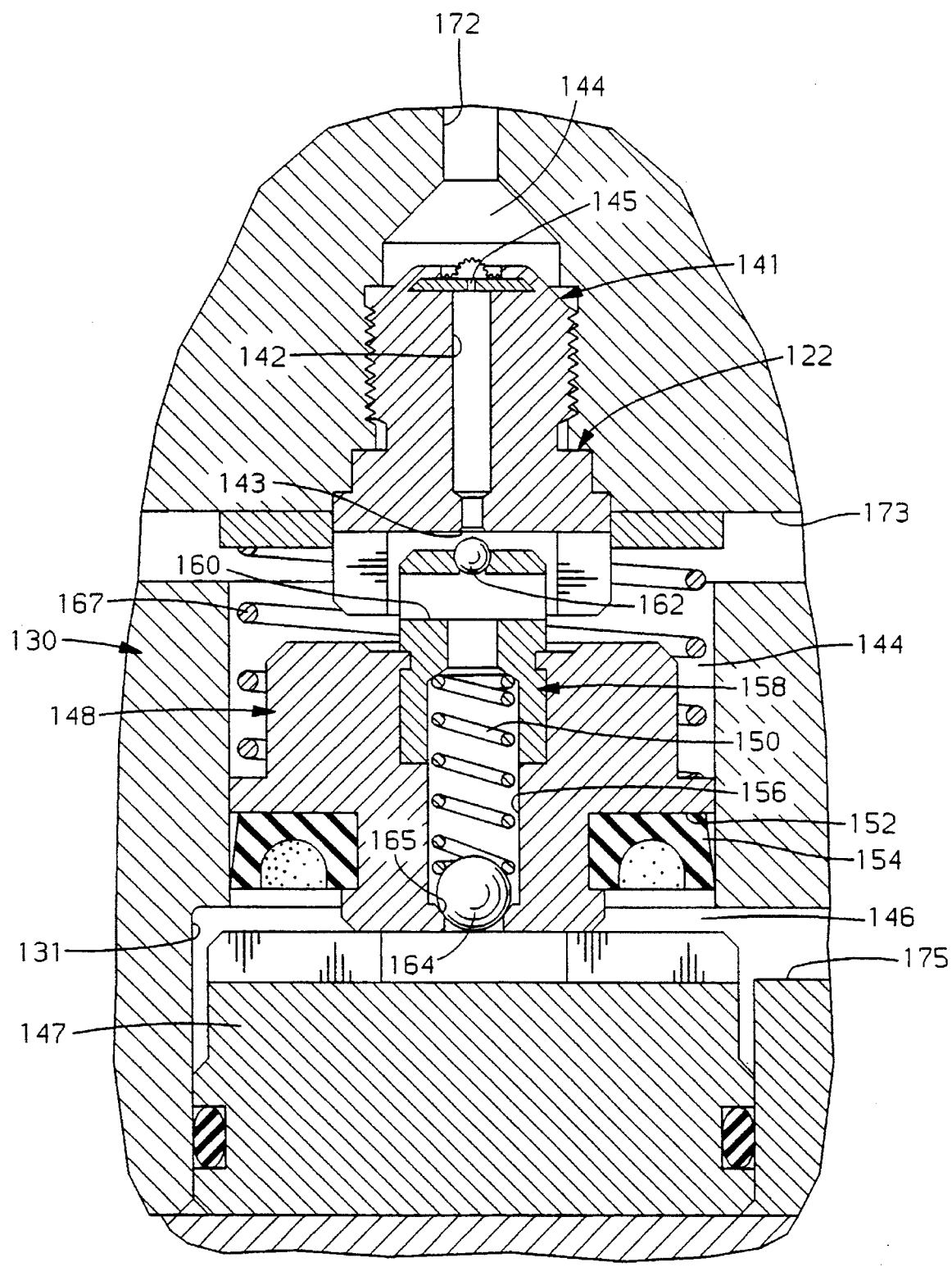
FIG. 4 is a schematic illustration of an apply orifice isolation valve.

Referring to FIG. 4, an embodiment of apply orifice isolation valve 102 is illustrated as apply orifice isolation valve assembly 122. Apply orifice isolation valve assembly 122 is disposed in bore 131 of module 130. Insert 141 is fixed in bore 131 and includes axial bore 142 which forms valve seat 143. A plate including apply orifice 145 engages insert 141 and is positioned along axial bore 142. The position of insert 141 in bore 131 forms a chamber 144 which is in fluid communication with conductor 172. Conductor 172 is in fluid communication with a brake master cylinder (not illustrated).

Piston 148 is slidably disposed in bore 131 between insert 141 and element 147. Piston 148 includes circumferential annular step 152 which carries lip seal 154. Bore 156 extends axially through piston 148. Insert 158 is fixedly disposed in bore 156 of piston 148 and includes cross bore 160. Ball 162 is affixed to insert 158.

Piston 148 is biased against element 147 by spring 167 such that a flow passage is normally open between axial bore 142 and chamber 144 through valve seat 143. Communicating with bore 131 is conductor 173 which extends to a base brake isolation valve, such as base brake isolation valve 133 of FIG. 3, and conductor 175 which extends to a wheel brake such as wheel brake 126 of FIG. 3. Lip seal 154 engages the wall of bore 131 such that fluid is allowed to communicate from chamber 144 to chamber 146 by compressing the lip seal 154 when a relatively low minimum pressure differential exists therebetween. To compress lip seal 154 and establish flow from chamber 144 to chamber 146 the greater fluid pressure must occur in chamber 144.

Ball 164 is carried in bore 156 and is biased by spring 150 against valve seat 165. Ball 164 is normally biased against valve seat 165 by spring 150 such that fluid communication between chambers 146 and 144 is normally prohibited. However, in order to protect valve seat 143 from excessively high loads, ball 164 will move to compress spring 150 and thereby move off valve seat 165 opening a flow passage between chambers 146 and 144 when a sufficiently high pressure differential exists therebetween, with the greater fluid pressure occurring in chamber 146.

Illustrated in FIG. 3 is one channel of a diagonal split braking system supplied with braking pressure by master cylinder 125 and pump 178. The front braking circuit 179 supplied with fluid pressure through conductor 117 is essentially the same as the front braking circuit described in relation to FIG. 1.

The rear braking circuit supplied with fluid pressure through conductor 118, includes a conventionally known proportioner 135 that is located upstream of base brake isolation valve 133 and apply orifice isolation valve 102. Apply orifice isolation valve 102 is in fluid communication with: proportioner 135 through conductor 185; base brake isolation valve 133 through conductors 187 and 188; and wheel brake 126 through conductors 189 and 184. The base brake isolation valve 133 is in fluid communication with: conductor 118 through conductor 191; wheel brake 126 through conductors 183 and 184; apply orifice isolation valve 102 through conductors 188 and 187; and release solenoid 128 through conductor 188. Release solenoid valve 128 comprises a normally closed solenoid operated valve and is disposed in the circuit between base brake isolation valve 133 and accumulator 138. Check 164 is provided between conductors 189 and 187.

The operation of rear wheel brake circuit 180 will now be described as if the apply orifice isolation valve assembly 102 replaces the apply orifice 80. Base brake isolation valves 50 and 133 as depicted in FIGS. 1 and 3 respectively, remain essentially the same except for the external hydraulic connections.

In the base brake mode of operation, fluid contained in master cylinder 125 is forced into wheel brake 126 through conductor 193 and the brake modulator circuit. Fluid flow in the rear brake circuit 180 passes through conductor 118, proportioner 135 and subsequently diverges into parallel paths through the base brake isolation valve 133 (as detailed by base brake isolation valve 50 in FIG. 2), and apply orifice isolation valve 102 (as detailed by apply orifice isolation valve 122 in FIG. 4). From each of these valves, fluid flow is directed through conductor 184 to wheel brake 126.

In base brake operation, the ball 85 of base brake isolation valve 50 is maintained in an unseated position off valve seat 89 by protrusion 51. The piston 81 is biased by spring 88 such as to force protrusion 51 to unseat ball 85. The passageway through piston 81 embodied by release bore 54, axial bore 52 and release orifice 83 provides an amount of hydraulic balancing between chambers 48 and 47 sufficient to assure that the base brake isolation valve remains open during base brake operation. This provides the advantage that no significant flow orificing occurs between the proportioner 135 and the wheel brake 126 during base brake operation. Additionally, for reverse flow in base brake operation, when a driver's foot is released from the brake pedal actuator 120, with the retraction of wheel brake 126 fluid is forced through the hydraulic modulator and associated conductors back to the master cylinder 125.

As noted, during base brake application, fluid enters the base brake isolation valve assembly 50 and passes unrestricted past ball 85. In addition, the apply orifice isolation valve 122 remains fully open during base brake apply thus permitting additional brake fluid to flow through parallel flow paths to wheel brake 126.

ABS operation is engaged when sufficient wheel slip is detected in a braking stop such that the ECU 190 determines corrective action of brake pressure regulation is necessary. The pump 178 is immediately turned on and continues to run throughout the remainder of the ABS cycle. Simultaneously, the release solenoid valve 128 is energized to initiate a pressure release cycle. The opening of release solenoid valve 128 creates a pressure drop in chamber 48 on the bottom side of the base brake isolation valve's piston 81. In reaction, piston 81 moves against the force of spring 88 such that protrusion 51 is retracted from valve seat 89 and ball 85 is biased against the valve seat 89 by spring 86. This closes off flow through the base brake isolation valve between chamber 49 and chamber 47.

The base brake isolation valve assembly 50 will remain closed until the hydraulic force imbalance is substantially equalized between chambers 47 and 49. The drag force of lip seal 87 against the wall of bore 46 is not significant in inhibiting movement of piston 81 to reopen the passageway by unseating ball 81, when the pressure between chambers 47 and 49 is substantially equalized.

During ABS release, the pressure imbalance between chambers 47 and 48 caused by the flow of fluid through the release solenoid 128 creates a pressure imbalance across the apply orifice isolation valve piston 148. A drop in pressure in chamber 144 causes the piston 148 to move to compress spring 167 placing ball 162 against valve seat 143 and thus closing the flow of apply fluid through the apply orifice isolation valve 122. This prevents the application of pressurized fluid to the wheel brake 126 during an ABS release cycle.

This is the case until the release flow is sufficiently small to reduce the pressure drop across the release orifice 83 between chambers 47 and 48 to less than the apply pressure of master cylinder 125 divided by the hydraulic gain of the apply orifice isolation valve 122. The hydraulic gain is the ratio of the area of piston 148 to the open cross-sectional area through valve seat 143 minus the seal and spring losses. In the present embodiment the hydraulic gain is established such that the apply orifice isolation valve 122 will remain closed well below 25 psi braking pressure, which is generally sufficient to inhibit lockup of wheel brake 126 even in extremely limited friction situations.

During the ABS release cycle, flow through the release solenoid 128 immediately starts to fill the pump inlet accumulator 138 which permits an immediate pressure reduction at wheel brake 126. As the pump motor 177 achieves full speed fluid is simultaneously pumped from the inlet accumulator 138 to pressurize the inlet of the modulator circuit. Pressure thus becomes available again for use at the wheel brake 126 as needed. To minimize any effects that pulsation cycles created by pump 178 may have, a pump orifice 195 and damper assembly 196 is optionally used.

Following the release portion of an ABS cycle, as the pressure at wheel brake 126 becomes sufficiently reduced to prevent wheel lock, the next event is to initiate increasing pressure at wheel brake 126 to maximize braking forces. This is accomplished by de-energizing and thus closing the release solenoid 128. When fluid flow ceases, pressure is equalized on both sides of the apply orifice isolation valve assembly's piston 148 through the release orifice 83. The resulting force of the spring 167 and the fluid pressure times the open area at valve seat 143 moves the piston 148 to open the passageway through the apply orifice 145. Fluid pressure is subsequently fed through apply orifice 145 to the wheel brake 126 at a controlled apply rate based upon the pressure differential between the master cylinder 125 and the wheel brake 126. The apply orifice 145 is sized to compensate for caliper stiffness and the desired ABS apply rates.

Forming the apply orifice 145 thin and as square-cornered as possible, minimizes changes in flow rates at a given pressure differential for varying viscosity effects thus producing consistent pressure apply rates. The lip seal 154 provides a parallel flow path between apply orifice 145 and the wheel brake 126, one path being past the lip seal 154 and the other being through the base brake isolation valve assembly 50 and thus through release orifice 83.

If wheel lock is once again approached, supplemental release and apply cycles are repeated as often as required to achieve the desired ABS control. Constant pressure at wheel brake 126 is optionally simulated by providing pulsed opening and closure of the release orifice 128 to provide an average pressure band width approximation of the desired constant pressure.

When the pressure at wheel brake 126 approaches the pressure of master cylinder 125, both base brake isolation valve 50 and apply orifice isolation valve assembly 122 are hydraulically forced to open and the normal base brake function is resumed. At any point in the cycle, the ABS cycling is resumable by operation of the release solenoid 128 according to ECU 190 control.

What is claimed is:

1. A brake system comprising:

a first wheel brake;

a second wheel brake;

a pressurized fluid source;

a first apply conductor communicating between the pressurized fluid source and the first wheel brake;

a first solenoid valve having an internal check positioned along the first apply conductor;

a first release conductor communicating between the pressurized fluid source and the first wheel brake;

a second solenoid valve positioned along the first release conductor;

a second apply conductor communicating between the pressurized fluid source and the second wheel brake including first and second parallel flow paths;

an apply orifice positioned in the second parallel flow path;

a base brake isolation valve having a first flow port in fluid communication with the second wheel brake a second port in fluid communication with the first parallel flow path and a third flow port in fluid communication with the second parallel flow path;

a second release conductor communicating between the second wheel brake and the pressurized fluid source and communicating through the base brake isolation valve; and a third solenoid valve positioned along the second release conductor.

2. A brake system according to claim 1 further comprising an apply isolation valve positioned along the second parallel flow path.

3. A brake system according to claim 2 wherein the apply isolation valve and apply orifice are integrated into a single apply orifice isolation valve assembly.

4. A brake system according to claim 3 wherein the apply orifice isolation valve assembly includes first, second and third ports, The first port of the apply orifice isolation valves assembly communicating with the pressurized fluid source, the second port of the apply orifice isolation valve assembly communicating through the second parallel flow path with the second port of the base brake isolation valve and the third port of the apply orifice isolation valve assembly communicating with the second wheel brake.

5. A brake system according to claim 1 wherein the base brake isolation valve includes an integral release orifice.

6. A brake system according to claim 5 wherein the base brake isolation valve includes an integral uni-directional bypass around the release orifice.

* * * * *